Nov. 2, 1954  G. F. HALL  2,693,551
MOTOR VEHICLE HEADLIGHT SAFETY RELAY
Filed Dec. 13, 1950
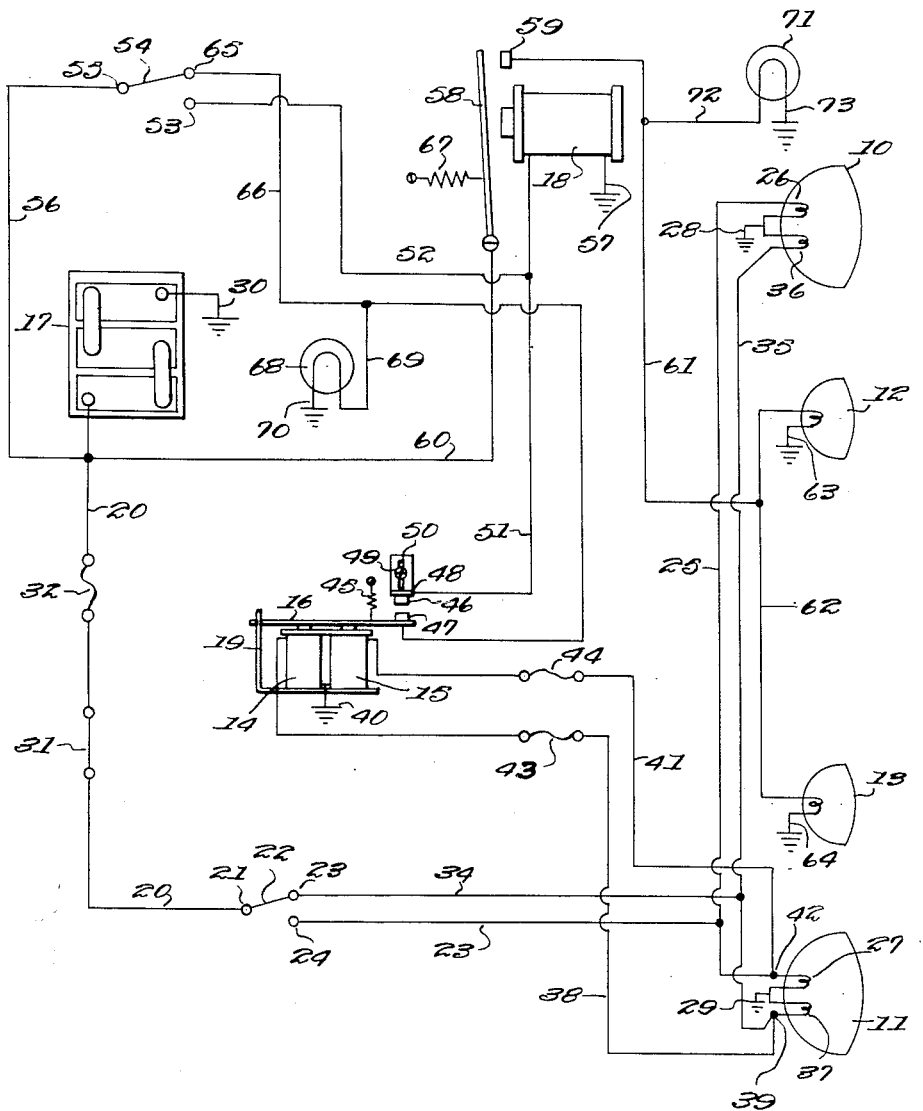
INVENTOR.
Gene F. Hall,
BY Victor J. Evans &co.
ATTORNEYS

United States Patent Office 2,693,551
Patented Nov. 2, 1954

2,693,551

MOTOR VEHICLE HEADLIGHT SAFETY RELAY

Gene F. Hall, Stoneville, N. C.

Application December 13, 1950, Serial No. 200,558

1 Claim. (Cl. 315—83)

This invention relates to light circuits of motor vehicles where auxiliary or fog lights are provided and wherein circuits are completed to the auxiliary lights when a fuse in a main headlight circuit is blown by a short or other interruption in the circuit, and in particular a relay connected in the main headlight circuit with contacts that are held open as long as the main headlight circuit is completed and that, upon shorting of the main headlight circuit, closes to complete a circuit to auxiliary or fog lights.

Various types of devices have been incorporated in motor vehicles for providing safety lights when circuits to the headlights are shorted or broken but it has been found difficult to provide a device that does not interfere with the conventional operation of the circuit. With this thought in mind this invention contemplates a relay actuated by coils in circuits to both the bright and dim lights and secondary or fog lights with a circuit connected to the relay whereby the lights function in the conventional manner until the circuit is interrupted by a short or the like and wherein upon shorting of the headlight circuit the relay is released to complete a circuit to auxiliary or fog lights, of a vehicle.

The object of this invention is, therefore, to provide means for completing a circuit to auxiliary lights when the main headlights of a motor vehicle will not light.

Another object of that invention is to provide auxiliary lights with a relay actuated circuit for providing a light when the circuit to the main headlights of a motor vehicle is broken that may be incorporated in vehicles now in use.

A further object of the invention is to provide means for providing auxiliary or fog lights when the circuit to the main headlights of a motor vehicle is interrupted which operates automatically and which is of a comparatively simple and economical construction.

With these and other objects and advantages in view the invention embodies a relay having a pair of coils with one coil connected across the bright side of the headlights of a motor vehicle and another coil connected across the dim side of the lights with the coils positioned, when energized to hold contacts in a circuit to auxiliary lights open whereby when the coils are deenergized by the interruption of the main headlight circuit a circuit will be completed to auxiliary lights.

Other features and advantages of the invention will appear from the following description taken in connection with the drawing, wherein the drawing is a diagrammatic view showing the wiring diagram with the main headlights, auxiliary or fog lights, relays, switches and the like incorporated therein.

Referring now to the drawing wherein like reference characters denote corresponding parts the safety motor vehicle light circuit of this invention includes headlights 10 and 11, auxiliary or fog lights 12 and 13, a relay including coils 14 and 15 and a contact arm 16, a battery 17, a relay 18, and suitable switches, fuses and other elements.

The coil 14 of the relay 19 is connected in the dim light circuit of the main headlights and the coil 15 is connected in the bright light circuit. The bright light circuit of the headlights 10 and 11 is connected to the battery 17 by a wire 20 which extends to a terminal 21 of a dimmer switch 22 and from the switch 22 a wire 23 connects a terminal 24 of the switch to a wire 25 extending to the bright or high elements 26 and 27 of the main headlights. The opposite terminals of the bright elements are grounded, as indicated at the points 28 and 29, respectively. The battery 17 is provided with a ground 30, whereby with the main headlight switch 31 closed and with the dimmer switch 22 positioned on the terminal 24 the circuit is completed to the bright or high side of the main headlights. The wire 20 is provided with a fuse 32.

A similar circuit is completed to the dimmer lights or low side of the headlights with a terminal 23 of the dimmer switch connected by a wire 34 to a wire 35 that extends to the dimmer elements 36 and 37. The opposite terminals of the elements are connected to the grounds 28 and 29, respectively.

A wire 38 connects a terminal 39 of the dimmer element circuit to one side of the coil 14 and the opposite side of the coil is connected to a ground 40. A similar wire 41 connects a terminal 42 of the bright side of the headlights to the coil 15, with the opposite side of the coil connected to a ground 40. The wire 38 is provided with a fuse 43 and the wire 41 is provided with a similar fuse 44.

With the parts arranged in this manner the coil 14 is energized when a circuit is completed to the dim lights and the coil 15 is energized when a circuit is completed to the bright lights of the vehicle. Should either of these circuits be shorted or interrupted the circuits to the coils 14 and 15 will be broken and a spring 45 will move the contact arm 16 upwardly, bringing contacts 46 and 47 into engagement whereby a circuit is completed to the auxiliary lights 12 and 13.

The contact 46 is attached to a clip 48 that is adjustably mounted by a screw 49 in a slot 50 and a wire 51 connects the contact to the solenoid of the relay 18. A branch wire 52 also connects the wire 51 to a terminal 53 of a fog or auxiliary light switch having a contact arm or finger 54. The terminal 55 of the switch is connected by a wire 56 to the battery 17, through the wire 20.

With the contact arm 54 of the fog light switch positioned on the contact 53 a circuit is completed from the battery 17 through the wires 56 and 52 to the wire 51 which is connected to the solenoid 18 and with the opposite side of the solenoid connected to a ground 57 the solenoid is energized and a contact arm or member 58 held against a contact piece 59. By this means a circuit is completed from the battery 17 to the wire 20 and by a wire 60 to the contact arm 58, and from the contact 59 and a wire 61 to the auxiliary or fog lights 12 and 13 through a wire 62, and with the opposite terminals of the lights 12 and 13 connected to grounds 63 and 64 circuits to the lights will be completed.

For automatic operation the contact arm 54 is positioned on the contact 65, as shown in the drawing and the contact 65 is connected by a wire 66 to the contact 47 which, with the relay deenergized, contacts the contact 46 and completes a circuit through the wire 51 to the solenoid 18. This circuit, however, is not completed unless there is a short or interruption in the main headlight circuit as with the main headlight circuit complete the coils 14 and 15 are energized thereby and the contact 47 is held away from the contact 46.

The contact arm 58 of the relay of the auxiliary or fog light circuit in which the solenoid 18 is positioned is provided with a spring 67 that holds the contact arm away from the solenoid when the solenoid is deenergized.

The auxiliary or fog light circuit is also provided with indicating lights with a green light 68 connected to the wire 66 by a wire 69 and to a ground 70 whereby with the fog lights circuit open, as shown in the drawing, and with the contact arm 54 in contact with the terminal 65 the circuit is completed from the battery through the wire 56 to the arm 54 and from the arm 54 through the wire 66 to the wire 69 which completes the circuit to the green light 68 and to the ground 70.

When the auxiliary or fog light circuit is closed a red light 71 which is connected to the wire 61 by a wire 72 and also to a ground 73 provides means for indicating that the auxiliary or fog light is turned on.

With the parts arranged in this manner the automatic safety light relay is connected in parallel with the main headlight circuit so that there is no series resistance and the lights are not dim.

With the fuses 43 and 44 in the relay circuits a short in the auxiliary or relay circuits will blow one of these fuses without blowing the fuse of the main headlight circuit.

With the parts arranged in this manner means is provided for automatically providing an auxiliary or fog light when a circuit to a main headlight is shorted or interrupted by any means. By means of the auxiliary or fog light switch the circuit to the auxiliary or fog lights may be set to function to provide a fog light in the conventional manner, and may also be set so that the device will operate automatically and provide a light upon failure of the main headlights of the vehicle.

It will be understood that modifications may be made in the design and arrangement of the parts without departing from the spirit of the invention.

What is claimed is:

In a car lamp circuit, a pair of main head lamps having bright elements and dim elements, a pair of auxiliary lamps and a battery, a dimmer switch having a first terminal connected to said battery, a second terminal connected to said bright elements, a conductive line connecting a third terminal of said dimmer switch to said dim elements, a relay including a first coil having a terminal, a conductive line having a fuse therein and connecting said terminal of said first coil to said dim elements, said relay including a second coil having a terminal, a conductive line having a fuse therein and connecting said terminal of said second coil to said bright elements, said relay further including a spring loaded movable contact arm mounted for movement towards and away from said coils and having a first contact thereon, a second contact adapted to be engaged by said first contact, a solenoid connected to said second contact, said solenoid having a fixed contact piece, an auxiliary switch connected to said battery and having a first terminal connected to said second contact, said auxiliary switch further including a second terminal, a conductive line connecting the second terminal of said auxiliary switch to said first contact, a first indicating lamp connected to said last named line, a spring loaded movable contact member mounted adjacent said solenoid for movement into and out of engagement with said contact piece and connected to said battery, said contact piece being connected to said auxiliary lamps, and a second indicating lamp connected to said auxiliary lamps for indicating when the auxiliary lamps are on.

References Cited in the file of this patent
UNITED STATES PATENTS

| Number | Name | Date |
|---|---|---|
| 2,427,076 | Tabacchi | Sept. 9, 1947 |
| 2,528,245 | Riggins | Oct. 31, 1950 |